United States Patent
Xu

(10) Patent No.: US 9,891,375 B2
(45) Date of Patent: Feb. 13, 2018

(54) BACKLIGHT MODULE AND LIQUID CRYSTAL DISPLAY APPARATUS

(71) Applicant: Wuhan China Star Optoelectronics Technology Co., Ltd., Wuhan (CN)

(72) Inventor: Pengbo Xu, Wuhan (CN)

(73) Assignee: Wuhan China Star Optoelectronics Technology Co., Ltd., Wuhan (CN)

(*) Notice: Subject to any disclaimer, the term of this patent is extended or adjusted under 35 U.S.C. 154(b) by 0 days.

(21) Appl. No.: 15/318,996

(22) PCT Filed: Jul. 12, 2016

(86) PCT No.: PCT/CN2016/089720
§ 371 (c)(1),
(2) Date: Dec. 15, 2016

(87) PCT Pub. No.: WO2017/215061
PCT Pub. Date: Dec. 21, 2017

(65) Prior Publication Data
US 2017/0363802 A1    Dec. 21, 2017

(30) Foreign Application Priority Data

Jun. 16, 2016    (CN) .......... 2016 1 0435336

(51) Int. Cl.
| | |
|---|---|
| *G02B 6/10* | (2006.01) |
| *G02B 6/43* | (2006.01) |
| *G02B 6/42* | (2006.01) |
| *F21V 8/00* | (2006.01) |
| *G02F 1/1335* | (2006.01) |

(52) U.S. Cl.
CPC ...... *G02B 6/0088* (2013.01); *G02F 1/133512* (2013.01); *G02F 1/133608* (2013.01); *G02B 6/0081* (2013.01)

(58) Field of Classification Search
CPC ............ G02B 6/0088; G02B 6/0086; G02F 1/133608; G02F 1/133512
See application file for complete search history.

(56) References Cited

U.S. PATENT DOCUMENTS

| | | | |
|---|---|---|---|
| 8,497,951 B2 * | 7/2013 | Kobayashi | G02F 1/133308 345/102 |
| 2015/0277029 A1 * | 10/2015 | Watanabe | G02F 1/133308 362/606 |
| 2017/0192289 A1 * | 7/2017 | Won | G02F 1/133308 |
| 2017/0199322 A1 * | 7/2017 | Ochi | G02B 6/0088 |
| 2017/0212298 A1 * | 7/2017 | Chen | G02B 6/0088 |

* cited by examiner

*Primary Examiner* — Mariceli Santiago

(57) ABSTRACT

A backlight board and a liquid crystal display apparatus are disclosed. The backlight module includes a plastic frame and a square-shaped adhesive tape. The plastic frame has an attachment surface on the top surface of the plastic frame. The attachment surface includes a first attachment sub-surface and a second attachment sub-surface. The first attachment sub-surface is parallel with a light-exiting surface; the second attachment sub-surface is connected to an end of the first attachment sub-surface, and is at a predetermined angle in relation to a plane on which the first attachment sub-surface is disposed. A portion of the square-shaped adhesive tape that may extend outwardly from an edge of the plastic frame can be attached to a transitional surface to avoid extending out of the plastic frame.

16 Claims, 3 Drawing Sheets

BACKLIGHT MODULE AND LIQUID CRYSTAL DISPLAY APPARATUS

RELATED APPLICATIONS

This application is a National Phase of PCT Patent Application No. PCT/CN2016/089720 having International filing date of Jul. 12, 2016, which claims the benefit of priority of Chinese Patent Application No. 201610435336.X filed on Jun. 16, 2016. The contents of the above applications are all incorporated by reference as if fully set forth herein in their entirety.

FIELD AND BACKGROUND OF THE INVENTION

The present invention relates to the technical field of liquid crystal display technology, and more particularly to a backlight module and a liquid crystal display apparatus having the same.

With the development of mobile communication products and tablet computers, a lot of mobile phone manufacturers use "slim bezel" as a selling point to attract consumers. The width of a plastic frame of a backlight module is in direct relation to the border width of a mobile phone.

In a traditional backlight module, a black-white double-faced or black-black double-faced square-shaped adhesive tape will be adhered to the plastic frame so as to achieve connecting the liquid crystal module and the backlight module and preventing separation of optical films. In the meantime, the square-shaped adhesive tape is further used to block the gaps between the light guide plate and the optical films in the backlight module so as to prevent light leakage.

To avoid separation of optical films, the inner side of the ring structure of the square-shaped adhesive tape has to extend to the optical films, and the extension width on the optical film must meet a certain requirement. In the meantime, the square-shaped adhesive tape requires a certain stability to be fully adhered to the plastic frame. Therefore, the frame requires a certain border width to ensure the adhesion strength.

Currently, the design and manufacturing for a backlight module of a slim bezel mobile phone is limited by the following conditions: 1. the square-shaped adhesive tape has a minimum width of 0.45 mm for cutting; 2. the precision for assembling a backlight module is 0.1 mm. Based on the foregoing limitation, the smallest left/right border width of a backlight unit of a mobile phone is theoretically 0.45 mm. An ideal situation is that an edge of the square-shaped adhesive tape is aligned with an edge of the plastic frame (as shown in FIG. 1). In fact, there may be an assembling tolerance of ±0.1 mm in a practical assembling process, that is, when the tolerance is 0.1 mm, an edge of the square-shaped adhesive tape of the backlight module may extend 0.1 mm outwardly from the plastic frame. However, most clients do not accept that a square-shaped adhesive tape extends outwardly from the plastic frame; thus, a safe design is to have the square-shaped adhesive tape moving 0.1 mm inwardly, which means the least border width of the backlight unit would be 0.55 mm (as shown in FIG. 2). However, such design will reduce the adhesion strength of the square-shaped adhesive tape, and a light-shielding area of square-shaped adhesive tape on the backlight unit is widened, thereby affecting display quality.

Therefore, a technical problem existing in the conventional technology is the lack of a plastic frame structure which is able to let a square-shaped adhesive tape be fully adhered to a surface of the plastic frame without increasing the light-shielding area of the square-shaped adhesive tape.

SUMMARY OF THE INVENTION

The present invention provides a backlight module having a square-shaped adhesive tape which reaches a standard minimum width for cutting and still helps achieving frame slimming without the need of enhancing cutting ability and reducing assembling tolerance.

In order to solve the foregoing problem, the present invention provides a backlight module including:
a backlight board;
a light source mounted on the backlight board;
a light guide plate;
a plastic frame configured to fix the light guide plate; and
a square-shaped adhesive tape being adhered on a top surface of the plastic frame;
wherein the plastic frame has an attachment surface on the top surface of the plastic frame; the attachment surface includes a first attachment sub-surface and a second attachment sub-surface; the first attachment sub-surface is parallel with a light-exiting surface; the second attachment sub-surface is connected to an end of the first attachment sub-surface, and is at a predetermined angle in relation to a plane on which the first attachment sub-surface is disposed; a side portion of the square-shaped adhesive tape smoothly transits from the first attachment sub-surface to the second attachment sub-surface; wherein the second attachment sub-surface is an oblique surface; the predetermined angle between the second attachment sub-surface and the plane on which the first attachment sub-surface is disposed is within a range of 50 degrees to 70 degrees, and is preferably 60 degrees.

According to a preferred embodiment of the present invention, the second attachment sub-surface is a cambered surface.

According to a preferred embodiment of the present invention, a width of a continuous attachment area of the first attachment sub-surface and the second attachment sub-surface is within a range of 0.3 mm to 0.5 mm, and is preferably 0.3 mm.

According to a preferred embodiment of the present invention, the second attachment sub-surface is a concave surface.

According to a preferred embodiment of the present invention, the second attachment sub-surface is a waved surface.

According to a preferred embodiment of the present invention, a conjunction between the first attachment sub-surface and the second attachment sub-surface is configured as a cambered transitional surface.

According to a preferred embodiment of the present invention, a side of the square-shaped adhesive tape is aligned with an edge of the side portion of the plastic frame; an opposite side of the square-shaped adhesive tape is adhered on the first attachment sub-surface and the second attachment sub-surface.

The present invention further provides a backlight module including: a backlight board;
a light source mounted on the backlight board;
a light guide plate;
a plastic frame configured to fix the light guide plate; and
a square-shaped adhesive tape being adhered on a top surface of the plastic frame;
wherein the plastic frame has an attachment surface on the top surface of the plastic frame; the attachment surface includes a first attachment sub-surface and a second attachment sub-surface; the first attachment sub-surface is parallel with a light-exiting surface; the second attachment sub-surface is connected to an end of the first attachment sub-surface, and is at a predetermined angle in relation to a plane on which the first attachment sub-surface is disposed.

According to a preferred embodiment of the present invention, the second attachment sub-surface is an oblique surface.

According to a preferred embodiment of the present invention, the predetermined angle between the second attachment sub-surface and the plane on which the first attachment sub-surface is disposed is within a range of 50 degrees to 70 degrees, and is preferably 60 degrees.

According to a preferred embodiment of the present invention, the second attachment sub-surface is a cambered surface.

According to a preferred embodiment of the present invention, a width of a continuous attachment area of the first attachment sub-surface and the second attachment sub-surface is within a range of 0.3 mm to 0.5 mm, and is preferably 0.3 mm.

According to a preferred embodiment of the present invention, the second attachment sub-surface is a concave surface.

According to a preferred embodiment of the present invention, the second attachment sub-surface is a waved surface.

According to a preferred embodiment of the present invention, a side of the square-shaped adhesive tape is aligned with an edge of the side portion of the plastic frame; an opposite side of the square-shaped adhesive tape is adhered on the first attachment sub-surface and the second attachment sub-surface.

The present invention further provides a liquid crystal display apparatus including a backlight module and a liquid crystal panel attached to the backlight module; and the backlight module includes:

a backlight board;
a light source mounted on the backlight board;
a light guide plate;
a plastic frame configured to fix the light guide plate; and
a square-shaped adhesive tape being adhered on a top surface of the plastic frame;
wherein the plastic frame has an attachment surface on the top surface of the plastic frame; the attachment surface includes a first attachment sub-surface and a second attachment sub-surface; the first attachment sub-surface is parallel with a light-exiting surface; the second attachment sub-surface is connected to an end of the first attachment sub-surface, and is at a predetermined angle in relation to a plane on which the first attachment sub-surface is disposed.

According to a preferred embodiment of the present invention, the second attachment sub-surface is an oblique surface.

According to a preferred embodiment of the present invention, the predetermined angle between the second attachment sub-surface and the plane on which the first attachment sub-surface is disposed is within a range of 50 degrees to 70 degrees, and is preferably 60 degrees.

According to a preferred embodiment of the present invention, the second attachment sub-surface is a cambered surface.

According to a preferred embodiment of the present invention, a width of a continuous attachment area of the first attachment sub-surface and the second attachment sub-surface is within a range of 0.3 mm to 0.5 mm, and is preferably 0.3 mm.

The advantages of the present invention are: the backlight module and the liquid crystal display apparatus provided by the present invention mainly form a transitional surface at an edge of a plastic frame where an excessive portion of a square-shaped adhesive tape can be adhered on the transitional surface so that the excessive portion of the square-shaped adhesive tape would not extend outwardly from the plastic frame; in the meantime, the adhesion strength of the square-shaped adhesive tape is ensured.

BRIEF DESCRIPTION OF THE SEVERAL VIEWS OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF SPECIFIC EMBODIMENTS OF THE INVENTION

Figure 1:
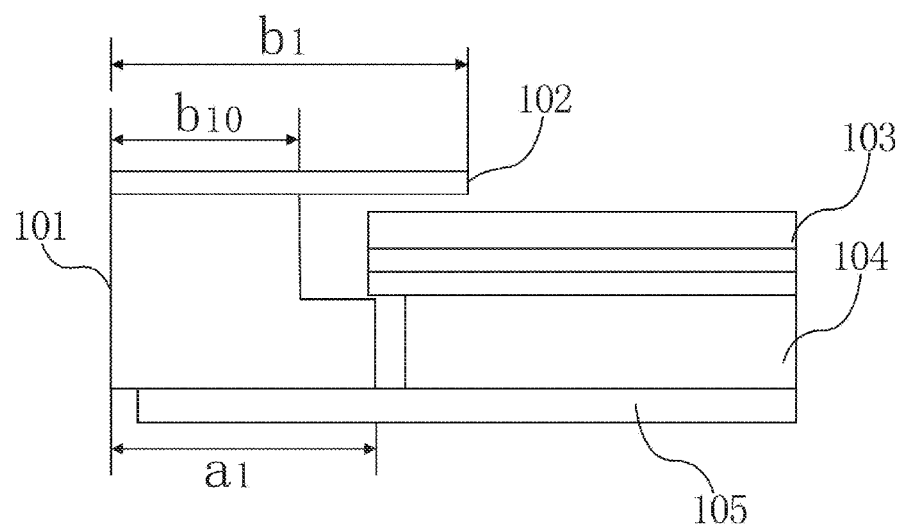
FIG. 1 is a first schematic cross-sectional side view of a simplified structure of a conventional backlight module.

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto. In the drawings, similar structural units are designated by the same reference numerals.

In view of the defect where a square-shaped adhesive tape may partially extend outwardly from an edge of a plastic frame due to assembling tolerance in the conventional backlight module assembling process, the present invention thus provides a new backlight module which is capable of overcoming this defect.

Please refer to FIG. 1, FIG. 1 is a first schematic cross-sectional side view of a simplified structure of a conventional backlight module.

As shown in FIG. 1, the backlight module includes a light guide plate 104, a reflector 105, an optical film 103, a plastic frame 101 and a square-shaped adhesive tape 102. The square-shaped adhesive tape 102 is adhered onto a surface of the plastic frame 101. In the drawings, letters are used for marking lengths, wherein a1=0.4 mm, b1=0.45±0.1 mm, b10=0.3 mm, wherein a1 is a width of a side portion of the plastic frame 101; b1 is a width of a side portion of the square-shaped adhesive tape 102; and b10 is a width of an adhesion area of the side portion of the square-shaped adhesive tape 102 to the plastic frame 101. An ideal situation is that the edge of the square-shaped adhesive tape 102 is aligned with the edge of the plastic frame 101. However, there may be an assembling tolerance of ±0.1 mm in a practical assembling process. While using this design, a side width of square-shaped adhesive tape is much larger, which will affect backlight performance; furthermore, the edge of the square-shaped adhesive tape would extend outwardly from the plastic frame, which not only affect the appearance of the backlight module but also makes assembling work more difficult.

Figure 2:
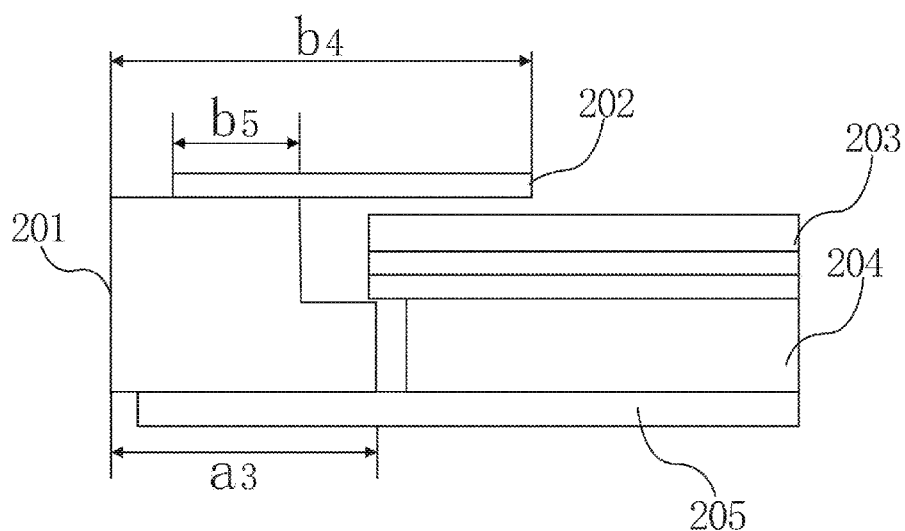
FIG. 2 is a second schematic cross-sectional side view of a simplified structure of a conventional backlight module.

Please refer to FIG. 2, FIG. 2 is a second schematic cross-sectional side view of a simplified structure of a conventional backlight module.

As shown in FIG. 2, the backlight module includes a light guide plate 204, a reflector 205, an optical film 203, a plastic frame 201 and a square-shaped adhesive tape 202. The square-shaped adhesive tape 202 is adhered onto a surface of the plastic frame 201. In the drawings, letters are used for marking lengths, wherein a3=0.4 mm, b4=0.55±0.1 mm, b5=0.2 mm, wherein a3 is a width of a side portion of the plastic frame 201; b4 is the sum of a width of a side portion of the square-shaped adhesive tape 202 and a distance from an outer edge of the side portion of the square-shaped adhesive tape 202 to an outer edge of the side portion of the plastic frame 201; and b5 is a width of an adhesion area of the side portion of the square-shaped adhesive tape 202 to the plastic frame 201. After the square-shaped adhesive tape 202 moved inwardly, the width b5 is reduced, which affects adhesion strength.

Figure 3:
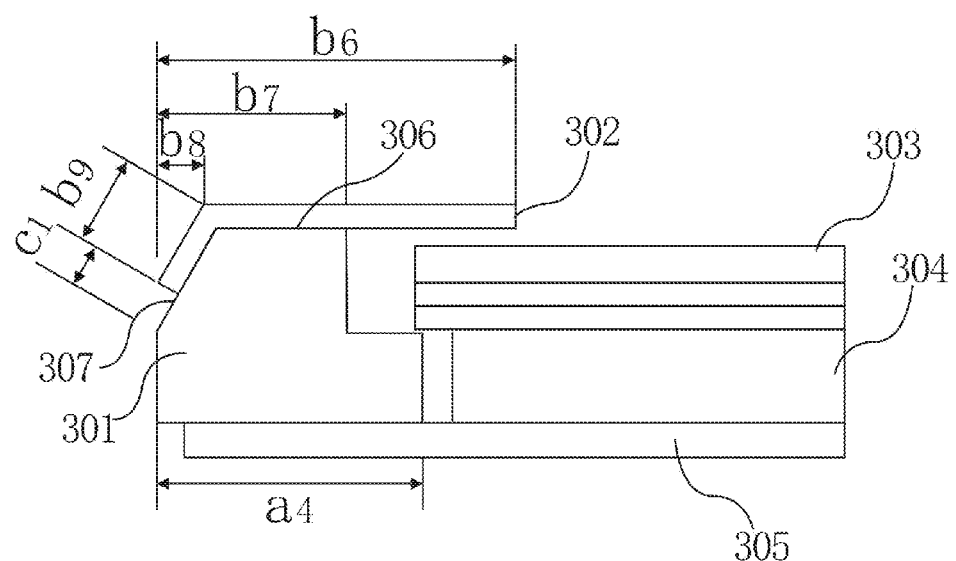
FIG. 3 is a schematic cross-sectional side view of a simplified structure of a backlight module according to a first embodiment of the present invention.

Please refer to FIG. 3, FIG. 3 is a schematic cross-sectional side view of a simplified structure of a backlight module according to a first embodiment of the present invention.

The present invention provides a liquid crystal display apparatus. The liquid crystal display apparatus includes a backlight module positioned in a bottom position and a liquid crystal module positioned in a top position, wherein the backlight module in the bottom position provides a backlight source for the liquid crystal module in the top position. The liquid crystal module includes a bottom polarizing plate, a liquid crystal layer and a top polarizing plate which are orderly stacked.

As shown in FIG. 3, the backlight module includes a light guide plate 304, a reflector 305, a light source, an optical film 303, a plastic frame 301 and a square-shaped adhesive tape 302 adhered onto a surface of the plastic frame 301. The square-shaped adhesive tape 302 is used to adhesively attach the backlight module to the liquid crystal module. Furthermore, a top surface and a bottom surface of the square-shaped adhesive tape 302 are adhesive surfaces, wherein the bottom surface of the square-shaped adhesive tape 302 is attached to a top surface of the plastic frame 301, and the top surface of the square-shaped adhesive tape 302 is attached to a bottom surface of the liquid crystal module. The plastic frame 301 includes an attachment surface disposed on the top surface of the plastic frame 301, wherein the attachment surface is divided into a first attachment sub-surface 306 and a second attachment sub-surface 307. The first attachment sub-surface 306 is parallel with a light-exiting surface; and the second attachment sub-surface 307 is connected to an end of the first attachment sub-surface 306 and is at a predetermined angle in relation to a plane on which the first attachment sub-surface 306 is positioned, wherein a4=0.4 mm, b6=0.45±0.1 mm, b7=0.3 mm, b8=0.1 mm, b9=0.1 mm, c1=0.1 mm; wherein a3 is a width of a side portion of the plastic frame 301; b6 is a width of a side portion of the square-shaped adhesive tape 302; b7 is a width of an adhesion area of the side portion of the square-shaped adhesive tape 302 to the plastic frame 301; b8 is a distance extended from an edge of the top surface of the plastic frame 301 to a side surface of the plastic frame 301; b9 is a width of an adhesion area of the side portion of the square-shaped adhesive tape 302 to the second attachment sub-surface 307; c1 is a width of a non-adhesion area where the second attachment sub-surface 307 is not adhered with the square-shaped adhesive tape 302; wherein c1 is a preserved width for attaching a wider square-shaped adhesive tape 302.

Using this design is equivalent to forming a plane of section on the conjunction between the top surface and a side surface of the plastic frame, which shortens the width of the top surface of the plastic frame 301 and forms an additional extension surface. This extension surface ensures a certain adhesion area for the square-shaped adhesive tape. Therefore, the width of the side portion of the square-shaped adhesive tape 302 is maintained at the minimum width of 0.45 mm; and a width of the adhesion area of 0.3 mm is ensured. The problem that the square-shaped adhesive tape 302 may extend out of the plastic frame 301 is also solved. An adhesion width within a range of 0.3 mm to 0.5 mm for the square-shaped adhesive tape 302 will satisfy the demand for adhesion strength, wherein an adhesion width of 0.3 mm for the square-shaped adhesive tape 302 may not only satisfy the demand for adhesion strength, but also achieve a slim frame.

While assembling the foregoing backlight module, a side of the square-shaped adhesive tape 302 is aligned with an edge of the side portion of the plastic frame 301, then the square-shaped adhesive tape 302 is smoothly adhered onto the top surface of the plastic frame 301. Another side of the square-shaped adhesive tape 302 is adhered on the first attachment sub-surface 306. In this case, a portion of the square-shaped adhesive tape 302 extends outwardly from the edge of the first attachment sub-surface 306, and in the end this excess portion of the square-shaped adhesive tape 302 is bent and smoothly adhered onto the second attachment sub-surface 307.

Preferably, a width of a continuous attachment area of the first attachment sub-surface 306 and the second attachment sub-surface 307 is at least 0.3 mm, that is, the side portion of the square-shaped adhesive tape 302 has an adhesion width of at least 0.3 mm for being adhered on the surface of the plastic frame 301, which prevents separation of optical films that would affect product quality.

The second attachment sub-surface 307 is configured as an oblique surface. While the side portion of the square-shaped adhesive tape 302 is applied on the oblique surface, a smoothly-press action is taken from the top surface of the square-shaped adhesive tape 302 to the edge of the side portion of the square-shaped adhesive tape 302 until the side portion of the square-shaped adhesive tape 302 is bent at the conjunction between the first attachment sub-surface 306 and the second attachment sub-surface 307 and then adhered on the second attachment sub-surface 307. The advantage of using the oblique surface as the second attachment sub-surface 307 is that the surface is flat enough for the square-shaped adhesive tape 302 to be easily applied and can provide a fast adhesion speed.

Preferably, the angle between the second attachment sub-surface 307 and the plane on which the first attachment sub-surface 306 is disposed is set to 60 degrees. When setting the angle respectively to 50, 60 and 70 degrees for testing the strength for peeling off the square-shaped adhesive tape 302, the larger the angle is, the more the strength needed to peel off the square-shaped adhesive tape 302. Comparing the angle of 60 degrees with the angle of 70 degrees, the width of the first attachment sub-surface 306 under the angle of 70 degrees is smaller than that of the first attachment sub-surface 306 under the angle of 60 degrees; that is, different adhesion areas for both angles. A strength needed to peel off the square-shaped adhesive tape 302 from the first attachment sub-surface 306 under the angle of 70 degrees is relatively smaller than that under the angle of 60 degrees. Thus, selecting 60 degrees will be a preferred embodiment.

Figure 4:
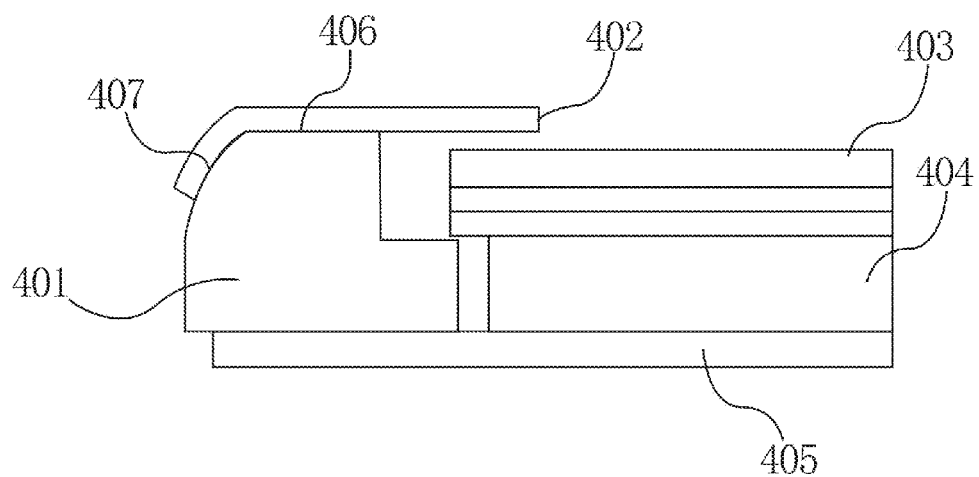
FIG. 4 is a schematic cross-sectional side view of a simplified structure of a backlight module according to a second embodiment of the present invention.

Please refer to FIG. 4, FIG. 4 is a schematic cross-sectional side view of a simplified structure of a backlight module according to a second embodiment of the present invention.

The present invention provides a liquid crystal display apparatus. The liquid crystal display apparatus includes a backlight module positioned in a bottom position and a liquid crystal module positioned in a top position, wherein the backlight module in the bottom position provides a backlight source for the liquid crystal module in the top position. The liquid crystal module includes a bottom polarizing plate, a liquid crystal layer and a top polarizing plate which are orderly stacked.

As shown in FIG. 4, the backlight module includes a light guide plate 404, a reflector 405, a light source, an optical film 403, a plastic frame 401 and a square-shaped adhesive tape 402 adhered onto a surface of the plastic frame 401. The square-shaped adhesive tape 402 is configured to adhesively attach the backlight module to the liquid crystal module. Furthermore, a top surface and a bottom surface of the square-shaped adhesive tape 402 are adhesive surfaces, wherein the bottom surface of the square-shaped adhesive tape 402 is attached to a top surface of the plastic frame 401, and the top surface of the square-shaped adhesive tape 402 is attached to a bottom surface of the liquid crystal module. The plastic frame 401 includes an attachment surface disposed on the top surface of the plastic frame 401, wherein the attachment surface is divided into a first attachment sub-surface 406 and a second attachment sub-surface 407. The first attachment sub-surface 406 is parallel with a light-exiting surface; and the second attachment sub-surface 407 is connected to an end of the first attachment sub-surface 406 and is at a predetermined angle in relation to a plane on which the first attachment sub-surface 406 is positioned.

Using this design is equivalent to forming a plane of section on the conjunction between the top surface and a side surface of the plastic frame 401, which shortens the width of the top surface of the plastic frame 401 and forms an additional extension surface. This extension surface ensures a certain adhesion area for the square-shaped adhesive tape 402. Therefore, the width of the side portion of the square-shaped adhesive tape 402 is maintained at the minimum width of 0.45 mm; and a width of the adhesion area of 0.3 mm is ensured. The problem that the square-shaped adhesive tape 402 may extend out of the plastic frame 401 is also solved. An adhesion width within a range of 0.3 mm to 0.5 mm for the square-shaped adhesive tape 402 will satisfy the demand for adhesion strength, wherein an adhesion width of 0.3 mm for the square-shaped adhesive tape 402 will not only satisfy the demand for adhesion strength, but also achieve a slim frame.

While assembling the foregoing backlight module, a side of the square-shaped adhesive tape 402 is aligned with an edge of the side portion of the plastic frame 401, then the square-shaped adhesive tape 402 is smoothly applied onto the top surface of the plastic frame 401. Another side of the square-shaped adhesive tape 402 is adhered on the first attachment sub-surface 406. In this case, a portion of the square-shaped adhesive tape 402 extends outwardly from the edge of the first attachment sub-surface 406, and in the end this excess portion of the square-shaped adhesive tape 402 is bent and smoothly adhered onto the second attachment sub-surface 407.

Preferably, a width of a continuous attachment area of the first attachment sub-surface 406 and the second attachment sub-surface 407 is at least 0.3 mm, that is, the side portion of the square-shaped adhesive tape 402 has an adhesion width of at least 0.3 mm for being adhered on the surface of the plastic frame 401, which prevents separation of optical films that would affect product quality.

The second attachment sub-surface 407 is configured as an arched surface. While the side portion of the square-shaped adhesive tape 402 is applied on the arched surface, the top surface of the square-shaped adhesive tape 402 is smoothly pressed along a direction towards the edge of the side portion of the square-shaped adhesive tape 402 so that the adhesion of the square-shaped adhesive tape 402 is transited from the first attachment sub-surface 406 to the second attachment sub-surface 407 and then the edge of the side portion of the square-shaped adhesive tape 402 is pressed in the middle, and finally the side portion of the square-shaped adhesive tape 402 is adhered on the second attachment sub-surface 407 after pressing the side portion of the square-shaped adhesive tape 402 from the middle to both sides thereof.

It is better to use the arched surface as the second attachment sub-surface than to use the oblique surface since the arched surface provides more adhesion areas, which more strengthens the adhesion of the square-shaped adhesive tape 402.

Preferably, the angle between the second attachment sub-surface 407 and the plane on which the first attachment sub-surface 406 is disposed is set to 60 degrees. When setting the angle respectively to 50, 60 and 70 degrees for testing the strength for peeling off the square-shaped adhesive tape 402, the larger the angle is, the more the strength needed to peel off the square-shaped adhesive tape 402. Comparing the angle of 60 degrees with the angle of 70 degrees, the width of the first attachment sub-surface 406 under the angle of 70 degrees is smaller than that of the first attachment sub-surface 406 under the angle of 60 degrees, that is, different angles result in different adhesion areas. A strength needed to peel off the square-shaped adhesive tape 402 from the first attachment sub-surface 406 under the angle of 70 degrees is relatively smaller than that under the angle of 60 degrees. Thus, selecting 60 degrees would be a preferred embodiment.

Figure 5:
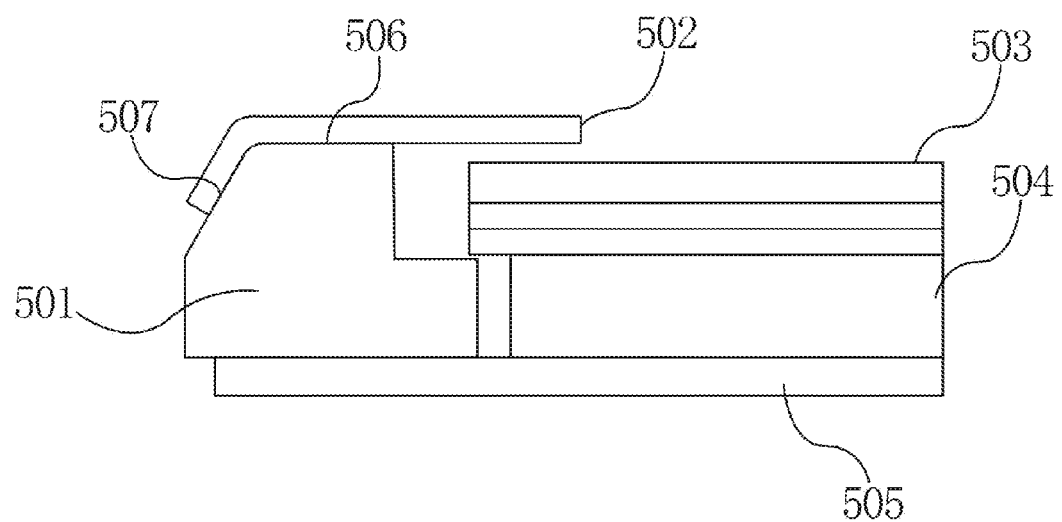
FIG. 5 is a schematic cross-sectional side view of a simplified structure of a backlight module according to a third embodiment of the present invention.

Please refer to FIG. 5, FIG. 5 is a schematic cross-sectional side view of a simplified structure of a backlight module according to a third embodiment of the present invention.

The present invention provides a liquid crystal display apparatus. The liquid crystal display apparatus includes a backlight module positioned in a bottom position and a liquid crystal module positioned in a top position, wherein the backlight module in the bottom position provides a backlight source for the liquid crystal module in the top position. The liquid crystal module includes a bottom polarizing plate, a liquid crystal layer and a top polarizing plate which are orderly stacked.

As shown in FIG. 5, the backlight module includes a light guide plate 504, a reflector 505, a light source, an optical film 503, a plastic frame 501 and a square-shaped adhesive tape 502 adhered onto a surface of the plastic frame 501. The square-shaped adhesive tape 502 is configured to adhesively attach the backlight module to the liquid crystal module. Furthermore, a top surface and a bottom surface of the square-shaped adhesive tape 502 are adhesive surfaces, wherein the bottom surface of the square-shaped adhesive tape 502 is attached to a top surface of the plastic frame 501, and the top surface of the square-shaped adhesive tape 502 is attached to a bottom surface of the liquid crystal module. The plastic frame 501 includes an attachment surface disposed on the top surface of the plastic frame 501, wherein the attachment surface is divided into a first attachment sub-surface 506 and a second attachment sub-surface 507. The first attachment sub-surface 506 is parallel with a light-exiting surface; and the second attachment sub-surface 507 is connected to an end of the first attachment sub-surface 506 and is at a predetermined angle in relation to a plane on which the first attachment sub-surface 506 is positioned.

Using this design is equivalent to forming a plane of section on the conjunction between the top surface and a side surface of the plastic frame 501, which shortens the width of the top surface of the plastic frame 501 and forms an additional extension surface. This extension surface ensures a certain adhesion area for the square-shaped adhesive tape 502. Therefore, the width of the side portion of the square-shaped adhesive tape 502 is maintained at the minimum width of 0.45 mm; and a width of the adhesion area of 0.3 mm is ensured. The problem that the square-shaped adhesive tape 502 may extend out of the plastic frame 501 is also solved. An adhesion width within a range of 0.3 mm to 0.5 mm for the square-shaped adhesive tape 502 will satisfy the demand for adhesion strength, wherein an adhesion width of 0.3 mm for the square-shaped adhesive tape 502 will not only satisfy the demand for adhesion strength, but also achieve a slim frame.

While assembling the foregoing backlight module, a side of the square-shaped adhesive tape 502 is aligned with an edge of the side portion of the plastic frame 501, then the square-shaped adhesive tape 502 is smoothly applied onto the top surface of the plastic frame 501. Another side of the square-shaped adhesive tape 502 is adhered on the first attachment sub-surface 506. In this case, a portion of the square-shaped adhesive tape 502 extends outwardly from the edge of the first attachment sub-surface 506, and in the end this excess portion of the square-shaped adhesive tape 502 is bent and smoothly adhered onto the second attachment sub-surface 507.

Preferably, a width of a continuous attachment area of the first attachment sub-surface 506 and the second attachment sub-surface 507 is at least 0.3 mm, that is, the side portion of the square-shaped adhesive tape 502 has an adhesion width of at least 0.3 mm for being adhered on the surface of the plastic frame 501, which prevents separation of optical films that would affect product quality.

The second attachment sub-surface 507 is configured as an oblique surface and the conjunction between the first attachment sub-surface 506 and the second attachment sub-surface 507 is configured as an arched transitional surface. While the side portion of the square-shaped adhesive tape 502 is applied on the plastic frame 501, the excess portion of the square-shaped adhesive tape 502 which extends outwardly from the edge of the plastic frame 501 is bent along the arched transitional surface and then adhered onto the second attachment sub-surface 507. The arched surface is relatively smoother than the sharp edge. During adhesion, since the square-shaped adhesive tape 502 has flexibility itself, by pressing any parts of the edge portion of the square-shaped adhesive tape 502, the edge portion would be bent and attached to the arched transitional surface, and the rest portion of the square-shaped adhesive tape 502 can be easily adhered on the second attachment sub-surface 507. If the conjunction between the first attachment sub-surface 506 and the second attachment sub-surface 507 is configured as a sharp edge, by pressing a part of the edge portion of the square-shaped adhesive tape 502, although the edge portion can be bent, it cannot be fully attached to a lower side of the sharp edge, which results in a gap in the adhesion between the square-shaped adhesive tape 502 and the second attachment sub-surface 507, and thereby affecting the adhesion strength and decreasing product quality.

Preferably, the angle between the second attachment sub-surface 507 and the plane on which the first attachment sub-surface 506 is disposed is set to 60 degrees. When setting the angle respectively to 50, 60 and 70 degrees for testing the strength for peeling off the square-shaped adhesive tape 502, the larger the angle is, the more the strength needed to peel off the square-shaped adhesive tape 502. Comparing the angle of 60 degrees with the angle of 70 degrees, the width of the first attachment sub-surface 506 under the angle of 70 degrees is smaller than that of the first attachment sub-surface 506 under the angle of 60 degrees, that is, different angles result in different adhesion areas. A strength needed to peel off the square-shaped adhesive tape 502 from the first attachment sub-surface 506 under the angle of 70 degrees is relatively smaller than that under the angle of 60 degrees. Thus, selecting 60 degrees would be a preferred embodiment.

In conclusion, although the present invention has been described with reference to the preferred embodiment thereof, it is apparent to those skilled in the art that a variety of modifications and changes may be made without departing from the scope of the present invention which is intended to be defined by the appended claims.

What is claimed is:
1. A backlight module, comprising:
a backlight board;
a light source mounted on the backlight board;
a light guide plate;
a plastic frame configured to fix the light guide plate; and
a square-shaped adhesive tape being adhered on a top surface of the plastic frame;
wherein the plastic frame has an attachment surface on the top surface of the plastic frame; the attachment surface includes a first attachment sub-surface and a second attachment sub-surface; the first attachment sub-surface is parallel with a light-exiting surface; the second attachment sub-surface is connected to an end of the first attachment sub-surface, and is at a predetermined angle in relation to a plane on which the first attachment sub-surface is disposed; a side portion of the square-shaped adhesive tape smoothly transits from the first attachment sub-surface to the second attachment sub-surface;
wherein the second attachment sub-surface is an oblique surface;

wherein the predetermined angle between the second attachment sub-surface and the plane on which the first attachment sub-surface is disposed is within a range of 50 degrees to 70 degrees.

2. The backlight module as claimed in claim 1, wherein the second attachment sub-surface is a cambered surface.

3. The backlight module as claimed in claim 1, wherein a width of a continuous attachment area of the first attachment sub-surface and the second attachment sub-surface is within a range of 0.3 mm to 0.5 mm.

4. The backlight module as claimed in claim 1, wherein the second attachment sub-surface is a concave surface.

5. The backlight module as claimed in claim 1, wherein the second attachment sub-surface is a waved surface.

6. The backlight module as claimed in claim 1, wherein a conjunction between the first attachment sub-surface and the second attachment sub-surface is configured as a cambered transitional surface.

7. The backlight module as claimed in claim 1, wherein a side of the square-shaped adhesive tape is aligned with an edge of the side portion of the plastic frame; an opposite side of the square-shaped adhesive tape is adhered on the first attachment sub-surface and the second attachment sub-surface.

8. A backlight module, comprising:
a backlight board;
a light source mounted on the backlight board;
a light guide plate;
a plastic frame configured to fix the light guide plate; and
a square-shaped adhesive tape being adhered on a top surface of the plastic frame;
wherein the plastic frame has an attachment surface on the top surface of the plastic frame; the attachment surface includes a first attachment sub-surface and a second attachment sub-surface; the first attachment sub-surface is parallel with a light-exiting surface; the second attachment sub-surface is connected to an end of the first attachment sub-surface, and is at a predetermined angle in relation to a plane on which the first attachment sub-surface is disposed; wherein the second attachment sub-surface is an oblique surface.

9. The backlight module as claimed in claim 8, wherein the predetermined angle between the second attachment sub-surface and the plane on which the first attachment sub-surface is disposed is within a range of 50 to 70 degrees.

10. The backlight module as claimed in claim 8, wherein the second attachment sub-surface is a cambered surface.

11. The backlight module as claimed in claim 8, wherein a width of a continuous attachment area of the first attachment sub-surface and the second attachment sub-surface is within a range of 0.3 mm to 0.5 mm.

12. The backlight module as claimed in claim 8, wherein a side of the square-shaped adhesive tape is aligned with an edge of the side portion of the plastic frame; an opposite side of the square-shaped adhesive tape is adhered on the first attachment sub-surface and the second attachment sub-surface.

13. A liquid crystal display apparatus, comprising a backlight module and a liquid crystal panel fixed on the backlight module; wherein the backlight module includes:
a backlight board;
a light source mounted on the backlight board;
a light guide plate;
a plastic frame configured to fix the light guide plate; and
a square-shaped adhesive tape being adhered on a top surface of the plastic frame;
wherein the plastic frame has an attachment surface on the top surface of the plastic frame; the attachment surface includes a first attachment sub-surface and a second attachment sub-surface; the first attachment sub-surface is parallel with a light-exiting surface; the second attachment sub-surface is connected to an end of the first attachment sub-surface, and is at a predetermined angle in relation to a plane on which the first attachment sub-surface is disposed; wherein the second attachment sub-surface is an oblique surface.

14. The liquid crystal display apparatus as claimed in claim 13, wherein the predetermined angle between the second attachment sub-surface and the plane on which the first attachment sub-surface is disposed is within a range of 50 degrees to 70 degrees.

15. The liquid crystal display apparatus as claimed in claim 13, wherein the second attachment sub-surface is a cambered surface.

16. The liquid crystal display apparatus as claimed in claim 13, wherein a width of a continuous attachment area of the first attachment sub-surface and the second attachment sub-surface is within a range of 0.3 mm to 0.5 mm.

* * * * *